United States Patent
Matteo et al.

(10) Patent No.: US 7,818,010 B2
(45) Date of Patent: Oct. 19, 2010

(54) METHODS AND APPARATUS FOR ALLOCATING RESOURCES IN A DISTRIBUTED ENVIRONMENT

(75) Inventors: Peter J. Matteo, Eatontown, NJ (US); Sami Qutub, Millstone, NJ (US); Rafal Sitkowski, Old Bridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1068 days.

(21) Appl. No.: 11/141,365

(22) Filed: May 31, 2005

(65) Prior Publication Data
US 2006/0270413 A1 Nov. 30, 2006

(51) Int. Cl.
*H04W 72/00* (2009.01)

(52) U.S. Cl. ............. 455/450; 379/112.05; 379/114.07; 379/221.07; 379/265.05; 370/395.41; 370/477

(58) Field of Classification Search ............ 379/112.05, 379/221.07, 114.07, 265.05; 370/236.1, 370/395.41, 477; 455/450, 464
See application file for complete search history.

(56) References Cited

U.S. PATENT DOCUMENTS

| | | | |
|---|---|---|---|
| 5,740,238 A | | 4/1998 | Flockhart |
| 5,754,639 A * | | 5/1998 | Flockhart et al. ........ 379/266.05 |
| 5,862,136 A * | | 1/1999 | Irwin ...................... 370/395.4 |
| 6,049,547 A | | 4/2000 | Fisher |
| 6,449,646 B1 * | | 9/2002 | Sikora et al. ................ 709/226 |
| 6,678,371 B1 | | 1/2004 | Flockhart |
| 6,839,419 B1 | | 1/2005 | Flockhart |
| 6,978,006 B1 * | | 12/2005 | Polcyn ................... 379/265.12 |
| 2003/0231647 A1 * | | 12/2003 | Petrovykh .................... 370/429 |
| 2007/0121539 A1 * | | 5/2007 | Kikuchi ...................... 370/328 |

OTHER PUBLICATIONS

Avaya Interaction Center, "Using Qualifiers," Release 6.1, Business Advocate Configuration And Administration, Chapter 3, Aug. 2003.
Avaya Interaction Center, "Distributed Business Advocate," Release 6.1.3, Business Advocate Configuration and Administration, Chapter 3, Jun. 2004.
Avaya Interaction Center, "Managing Agents," Release 6.1.3, Business Advocate Configuration and Administration, Chapter 3, Aug. 2003.

* cited by examiner

*Primary Examiner*—Curtis Kuntz
*Assistant Examiner*—Yosef K Laekemariam
(74) *Attorney, Agent, or Firm*—Chapin IP Law, LLC; David W. Rouille, Esq.

(57) ABSTRACT

Methods and apparatus are provided for allocating resources in a distributed environment. The disclosed resource allocation techniques make resource allocation decisions when resources become available. A resource becomes available when the resource completes its previous work or becomes activated. Once it is determined that a resource has become available, the available resource is assigned to an appropriate request. The requests may be stored, for example, in a queue of requests. The available resource may be assigned to an appropriate request based on one or more predefined criteria, such as to service a request associated with a service class having the "greatest need." The resources may be, for example, a plurality of call agents that are associated with a call center.

22 Claims, 3 Drawing Sheets

US 7,818,010 B2

METHODS AND APPARATUS FOR ALLOCATING RESOURCES IN A DISTRIBUTED ENVIRONMENT

FIELD OF THE INVENTION

The present invention relates generally to the allocation of resources, and more particularly, to methods and apparatus for allocating resources in a distributed environment.

BACKGROUND OF THE INVENTION

For many enterprise applications, finite resources must be allocated among a number of requests for such resources. In a network call routing system, for example, incoming calls must often be routed to an appropriate call center agent at one or more local or remote call centers. Each call may be routed, for example, to the call center presently offering the shortest waiting time.

Resource allocation systems typically attempt to balance the work load among resources that are available at the time the work enters the system. This approach restricts the work fulfillment only to those resources that are available when the work enters the system. In addition, this approach commits the work to the limited resource pool associated with the selected subsystem and does not respond dynamically to changes in the conditions of other remote subsystems, after the allocation decision is made. Further, in the context of a call center, when a determination is made upon receipt of a new call to route the call to a remote call center, bandwidth between the switch where the call was received and the selected remote call center is allocated to route the call to the remote call center, and the bandwidth is effectively reserved for the entire duration of the call, including the time when the call is waiting for the remote agent to become available and the time when customer is actively speaking with the agent.

A need therefore exists for methods and apparatus for allocating resources in a distributed environment that dynamically react to changing conditions. A further need exists for methods and apparatus for allocating resources in a distributed environment that do not unnecessarily allocate resources until the work is ready to be performed.

SUMMARY OF THE INVENTION

Generally, methods and apparatus are provided for allocating resources in a distributed environment. The disclosed resource allocation techniques make resource allocation decisions when resources become available. A resource becomes available when the resource completes its previous work or becomes activated (i.e., when system conditions meet one or more specified system criteria).

According to one aspect of the invention, once it is determined that a resource has become available, the available resource is assigned to an appropriate request. The requests may be stored, for example, in a queue of requests. The available resource may be assigned to an appropriate request based on one or more predefined criteria, such as servicing a request associated with a service class having the "greatest need." In one exemplary implementation, the resources may be a plurality of call agents that are associated with a call center.

A more complete understanding of the present invention, as well as further features and advantages of the present invention, will be obtained by reference to the following detailed description and drawings.

DETAILED DESCRIPTION

The present invention provides methods and apparatus for allocating resources in a distributed environment that dynamically react to changing conditions. In particular, the disclosed resource allocation techniques make resource allocation decisions when resources become available. As used herein, a resource becomes available when the resource completes its previous work or becomes activated (i.e., when system conditions meet one or more specified system criteria).

In the context of a call center, a new call is not assigned or routed to a remote call center until the call center resource is available to process the call. In this manner, bandwidth between the switch where the call is received and the selected remote call center is not prematurely allocated to route the call to the remote call center, and such bandwidth is effectively reserved for only the duration of the customer conversation with the agent.

To achieve those goals every subsystem shares information about current subsystem conditions and any changes in those conditions. The work is queued locally on the subsystem when it arrives. As resources become available the work queued on local and remote subsystem is considered. The resource will be allocated to any remote subsystem requiring additional resources to meet its goals. Also, as remote subsystem conditions are changing the local subsystem will reevaluate possible commitment of its local resource to remote work.

In this manner, the present invention dynamically reacts to changing conditions by making the resource allocation decision at the time when resources become available, not at the time when the work enters the system. For example, the present invention can dynamically respond to changes in the size and availability of the qualified resources in the remote subsystems after the work has been queued anywhere in the enterprise system. The present invention allows an enterprise to dynamically react to changes in the availability of the enterprise resource pool, to optimize the work distribution throughout the enterprise.

Figure 1:
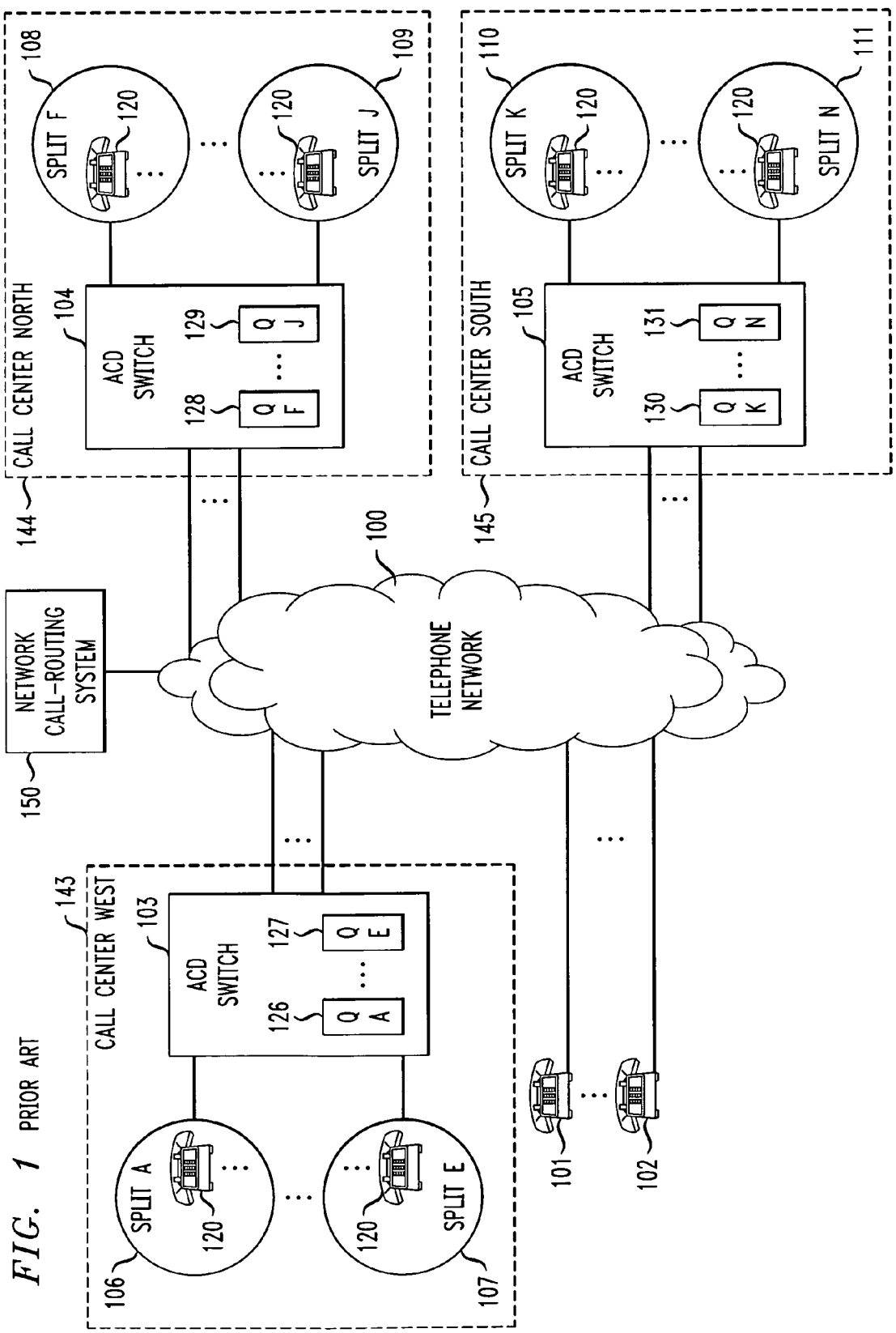
FIG. 1 is a block diagram of a communications system in which the present invention can operate.

FIG. 1 illustrates a conventional exemplary communications system. As shown in FIG. 1, the exemplary communication system comprises a plurality of networked call centers 143-145 respectively designated as "west", "north", and "south." Call centers 143-145 are interconnected with each other, and with telephones 101-102 of callers who are potential users of call centers 143-145, via a telephone network 100. Calls from telephones 101-102 are distributed between call centers 143-145 by a conventional network call-routing system 150. Call centers 143-145 send system 150 reports on their present status, and system 150 uses this information to route each call to the one of the call centers 143-145 where the call will be handled based on predefined criteria, such as minimal call waiting time.

Each call center 143-145 comprises an automatic call distribution (ACD) switch 103-105, respectively, and a plurality of agent position terminals 120, such as telephones. ACD switches 103-105 connect terminals 120 to telephone network 100. In each call center 143-145, the agents and their terminals 120 are divided into one or more splits 106-107, 108-109, and 110-111, respectively, and the respective ACD switch 103-105 defines a waiting-call queue 126-127, 128-129, and 130-131, for each of the splits 106-107, 108-109, and 110-111, respectively. Additionally, any one or more of the queues 126-131 may comprise a plurality of priority queues, each for holding waiting calls of a different priority (not shown).

Figure 2:
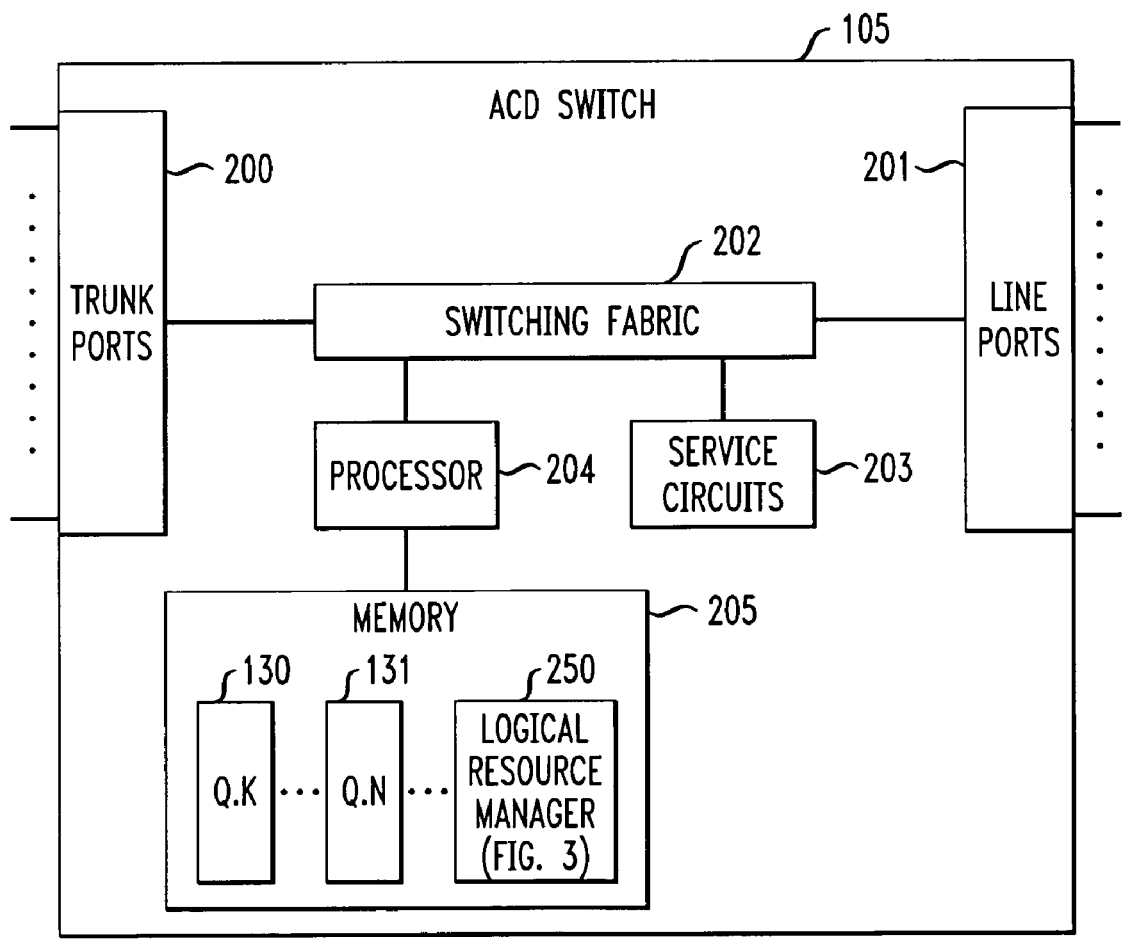
FIG. 2 is a block diagram of an automatic call distribution (ACD) switch of a call center of the communications system of FIG. 1.

FIG. 2 shows ACD switch 105 in greater detail. ACD switch 105 is representative of all ACD switches 103-105. ACD switch 105 conventionally includes trunk ports 200 for connecting ACD switch 105 to telephone network 100; line ports 201 for connecting ACD switch 105 to agent terminals 120; service circuits 203 that provide various services, such as tone generators, announcement generators, hold circuits, conference circuits, modems, etc.; a switching fabric 202 that selectively interconnects ports 200, ports 201, and service circuits 203; a processor 204 that controls switching fabric 202 and other elements of ACD switch 105; and a memory 205 which holds control programs and data which processor 204 executes and uses to control the operation of ACD switch 105.

As shown in FIG. 2, memory 205 includes queues 130-131 for incoming calls that may be processed by local or remote splits 106-111. In addition, memory 205 also includes a logical resource manager 250 that allocates resources in the distributed environment of FIG. 1 in accordance with the present invention. As previously indicated, the logical resource manager 250 makes resource allocation decisions when resources become available. Generally, the communication system of FIG. 1 comprises a plurality of networked call centers 143-145 each having a logical resource manager 250. In the exemplary embodiment, the logical resource managers 250 employ a set of enhanced, location-aware algorithms to match agents with contacts.

Switch 105 is illustratively the Avaya Communication Manager (ACM) private branch exchange (PBX), commercially available from Avaya Corp. of Basking Ridge, N.J.

The present invention can be employed in any distributed resource environment. The system can include several different deployments, including (i) multiple logical resource managers 250 in a single physical location, where each logical resource manager 250 is assigned service classes for a subset of the contacts that arrive in that location; (ii) multiple logical resource managers 250 in a single physical location, where each logical resource manager 250 is assigned service classes for contacts that arrive in different physical locations within the contact center; (iii) one logical resource manager 250 in each location, where each logical resource manager 250 is assigned service classes for contacts that arrive in the same physical location as the logical resource manager 250; or (iv) one logical resource manager 250 in only some of the physical locations, where a logical resource manager 250 can be assigned service classes for contacts that arrive in more than one physical location. For example, a contact center with one location in the United States and three locations in Europe can deploy one logical resource manager 250 to handle contacts that arrive in the United States and a second logical resource manager 250 to handle contacts that arrive in all locations in Europe.

Some of the examples described herein assume that the system spans multiple locations and includes one logical resource manager 250 in each location.

Among other functions, the distributed logical resource managers 250 ensure that qualified and available agents are matched with a contact. In various implementations, the logical resource managers 250 can match contacts with local or remote agents. Thus, each logical resource manager 250 can maintain the state of its own service classes (e.g., agents) and the service classes for all other logical resource managers 250 in the system. Each logical resource manager 250 obtains information about the state of service classes in the other logical resource managers 250 from a service class summary record. In one exemplary implementation, the service class information is exchanged, for example, using a publish/subscribe mechanism. This record is shared between all logical resource managers 250 in the system.

Figure 3:
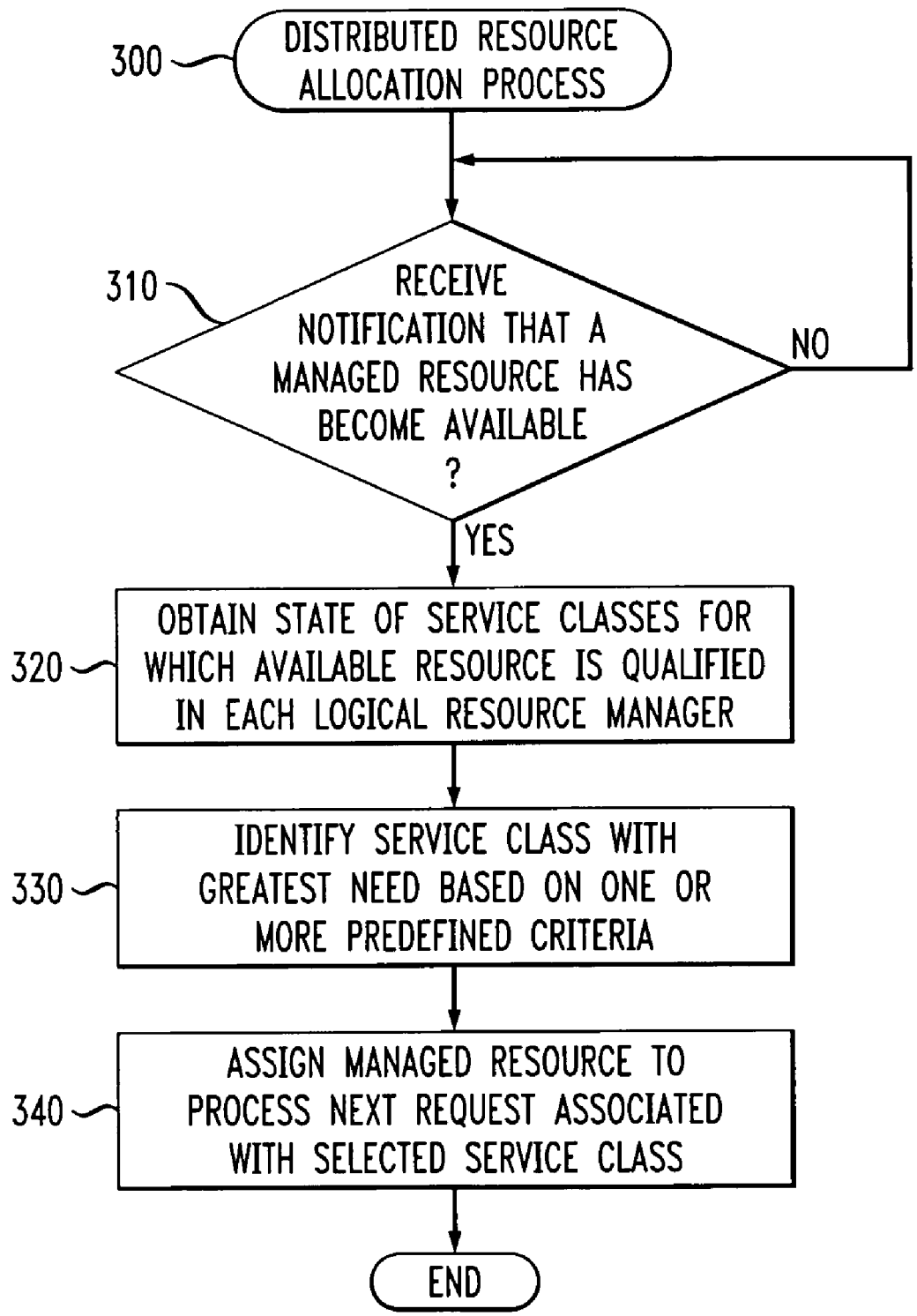
FIG. 3 is a flow chart describing an exemplary implementation of a distributed resource allocation process incorporating features of the present invention.

FIG. 3 is a flow chart describing an exemplary implementation of a distributed resource allocation process 300 incorporating features of the present invention that may be implemented by the logical resource manager 250 of FIG. 2.

As shown in FIG. 3, the distributed resource allocation process 300 is initiated during step 310 upon a notification that a managed resource has become available. For example, in an exemplary call center implementation, an agent may become available upon the successful completion of a prior call. Generally, a resource becomes available based on one or more predefined criteria or business rules, such as:

the number of different types of concurrent contacts agent can service;

the state of the contacts that the resource is currently handling;

the value to the enterprise of the specific or group of contacts; and the state of local or remote service classes.

Once it is determined during step 310 that a managed resource has become available, the available managed resource is matched with a request during steps 320 through 340.

After a resource becomes available, the distributed resource allocation process 300 obtains the state of the service classes for which the managed resource is qualified (i.e., capable) in each logical resource manager 250 during step 320. As previously indicated, the state of service classes may be obtained using a publish/subscribe mechanism and may be cached by each resource manager.

In one exemplary embodiment, each service class can progress through multiple states. Each state indicates that the service class is in greater need than the previous state. For example, each state indicates how close the service class is to exceeding its target or how much the service class has progressed beyond its target. It is noted that the "greatest need" generally does not mean that the customer is in the greatest need to speak to an agent. The "greatest need" is based on one or more predefined criteria for selecting which contact in the queue 130-131 should be chosen to meet or preserve goals for customer service and to give customers the desired level of service.

In the illustrative embodiment, all incoming requests for a resource are routed to the appropriate local logical resource manager 250 where the request is first received and are queued in a local queue 130-131 for the service class. A single logical resource manager 250 can be assigned to handle all received contacts, such as chat and email contacts, or a different logical resource manager 250 can be assigned for each media type.

For example, the following table shows the service class states for the service classes in each logical resource manager in a first scenario.

| Service classes | LRM1 | LRM2 | LRM3 |
| --- | --- | --- | --- |
| VoiceGold | On Target - Immediate Risk | On Target | On Target - Immediate Risk |
| VoiceSilver | On Target | On Target | On Target |

The service class with the greatest need is identified during step 330 based on one or more predefined criteria. In one exemplary implementation, when multiple service classes are in a state that indicates the greatest need, the distributed resource allocation process 300 prioritizes the assignment of requests to local resources, as follows. If the service classes in greatest need include at least one local service class associated with the logical resource manager 250 a local service class is selected. If no local service classes are in greatest need, a remote service class with the greatest need is selected. If two or more remote service classes are in the same state, services classes are selected, for example, based on a round-robin technique, selecting the remote service class with the oldest time stamp. The logical resource manager optionally applies a time stamp to a remote service class when an agent offered for that service class has been accepted.

In the first scenario indicated above, the service classes with the greatest need include one local service class that is associated with LRM1. Therefore, the distributed resource allocation process 300 matches the agent with the VoiceGold service class in LRM1.

The following table shows the service class states for the service classes in each logical resource manager in a second scenario:

| Service classes | LRM 1 | LRM2 | LRM3 |
| --- | --- | --- | --- |
| VoiceGold | On Target | On Target - Immediate Risk | On Target - Immediate Risk |
| VoiceSilver | On Target | On Target | On Target |

In the second scenario, none of the local service classes are in the greatest need. The VoiceGold service classes in LRM2 and in LRM3 are both in the same state and in the greatest need.

Once the service class with the greatest need is selected during step 330, the managed resource is assigned during step 340 to process the next request associated with the selected service class. For example, if the service class with the greatest need is a local service class, the request can be obtained from the associated queue 130-131. If, however, the service class with the greatest need is a remote service class, then the resource can be offered to a remote resource manager, to be matched to work queued at the remote service class.

It is noted that the matching of requests to managed resources can be restricted to resources in a specific location or region, for example, by adding a location qualifier to the service classes. The location qualifier can apply to only one site, or to a region (group of sites). The location qualifier restricts contacts in the service class to be delivered only to that location. For example, a location qualifier can ensure that email contacts received in a given country are only handled by agents in the same country.

For example, a call center agent can have one or more capability sets. Each capability set should include the same qualifiers as a service class that the agent can handle. The capability sets are used to match a contact with the agent. If the qualifiers in a capability set match the qualifiers in the service class for a contact, the distributed resource allocation process 300 matches the contact to the agent.

The present invention performs the resource allocation decision in a distributed system when any resource in the enterprise becomes available. Thus, work is not committed to any site at the time it arrives at the system. In addition, failover mechanisms are not required to move the work to be serviced by remote site resources in the event that no local resource is available.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A computer implemented method comprising:
receiving a request for a resource;
determining that said resource has become available in a distributed environment; and
assigning said resource to said request when said resource has become available, said resource assigned to said request based on at least one of a location qualifier, a service class qualifier, and an agent qualifier, and wherein said resource is one of a plurality of call center agents associated with a call center, wherein said request is received by a first subsystem of a plurality of subsystems of an enterprise system and is queued locally at said first subsystem and wherein every subsystem shares information about current subsystem conditions and any changes in said conditions and, wherein as the resource become available the request queued on any of said subsystems is considered for handling by any other subsystem, and wherein said request is assigned to a remote resource, and wherein a new call is not routed to a remote call center until the call center resource is available to process the call such that bandwidth between a switch where the call is received and a selected remote call center is not prematurely allocated to route the call to the remote call center and such bandwidth is effectively reserved for a duration of a customer conversation with an agent.

2. The method of claim 1, wherein said assigning step further comprises the step of evaluating a need of one or more service classes based on one or more predefined criteria.

3. The method of claim 1, wherein said assigning step further comprises the step of evaluating a state of a service class associated with said request.

4. The method of claim 3, further comprising the step of maintaining state information for a plurality of service classes.

5. The method of claim 1, further comprising the step of storing said request in a queue associated with a given service class.

6. The method of claim 1, wherein said assigning step further comprises the step of assigning said resource to a service class for which said resource is capable.

7. The method of claim 1, wherein said determining step further comprises the step of determining that said resource has become available based on one or more predefined criteria.

8. The method of claim 1, wherein said resource is one of a plurality of resources.

9. A system for allocating a resource to a request in a distributed environment, comprising:
  a memory; and
  at least one processor, coupled to the memory, operative to:
  receive a request for a resource;
  determine that said resource has become available in a distributed environment; and
  assign said resource to said request when said resource has become available, said resource assigned to said request based on at least one of a location qualifier, a service class qualifier, and an agent qualifier, and wherein said resource is one of a plurality of call center agents associated with a call center wherein said request is received by a first subsystem of a plurality of subsystems of an enterprise system and is queued locally at said first subsystem and wherein every subsystem shares information about current subsystem conditions and any changes in said conditions and, wherein as the resource become available the request queued on any of said subsystems is considered for handling by any other subsystem, wherein said request is assigned to a remote resource, and wherein a new call is not routed to a remote call center until the call center resource is available to process the call such that bandwidth between a switch where the call is received and a selected remote call center is not prematurely allocated to route the call to the remote call center and such bandwidth is effectively reserved for a duration of a customer conversation with an agent.

10. The system of claim 9, wherein said processor is further configured to evaluate whether said resource is local or remote.

11. The system of claim 9, wherein said processor is further configured to evaluate a state of a service class associated with said request.

12. The system of claim 11, wherein said processor is further configured to maintain state information for a plurality of service classes in a cache.

13. The system of claim 9, wherein said processor is further configured to store said request in a queue associated with a given service class.

14. The system of claim 9, wherein said processor is further configured to assign said resource to a service class for which said resource is capable.

15. The system of claim 9, wherein said processor is further configured to determine that said resource has become available based on one or more predefined criteria.

16. The system of claim 9, wherein said resource is one of a plurality of resources.

17. An article of manufacture for allocating a resource to a request in a distributed environment, comprising a machine readable medium containing one or more programs which when executed implement the steps of:
  receiving a request for a resource;
  determining that said resource has become available in a distributed environment; and
  assigning said resource to said request when said resource has become available, said resource assigned to said request based on at least one of a location qualifier, a service class qualifier, and an agent qualifier, and wherein said resource is one of a plurality of call center agents associated with a call center wherein said request is received by a first subsystem of a plurality of subsystems of an enterprise system and is queued locally at said first subsystem and wherein every subsystem shares information about current subsystem conditions and any changes in said conditions and, wherein as the resource become available the request queued on any of said subsystems is considered for handling by any other subsystem, wherein said request is assigned to a remote resource, wherein a new call is not routed to a remote call center until the call center resource is available to process the call such that bandwidth between a switch where the call is received and a selected remote call center is not prematurely allocated to route the call to the remote call center and such bandwidth is effectively reserved for a duration of a customer conversation with an agent.

18. The article of manufacture of claim 17 further including storing said request in a queue associated with a given service class.

19. The article of manufacture of claim 17 wherein said determining further comprises the step of determining that said resource has become available based on one or more predefined criteria.

20. The method of claim 1 wherein said determining and said assigning occurs after said request has been queued and not when said request enters said environment.

21. The system of claim 11 wherein said determining and said assigning occurs after said request has been queued and not when said request enters said environment.

22. The article of manufacture of claim 17 wherein said determining and said assigning occurs after said request has been queued and not when said request enters said environment.

* * * * *